(12) United States Patent
Kakimoto

(10) Patent No.: US 11,285,908 B2
(45) Date of Patent: Mar. 29, 2022

(54) AIRBAG PACKAGE

(71) Applicant: TOYODA GOSEI CO., LTD., Kiyosu (JP)

(72) Inventor: Kenji Kakimoto, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/929,480

(22) Filed: Jul. 15, 2020

(65) Prior Publication Data

US 2021/0094501 A1 Apr. 1, 2021

(30) Foreign Application Priority Data

Sep. 27, 2019 (JP) .............................. JP2019-177700

(51) Int. Cl.
| | |
|---|---|
| *B60R 21/201* | (2011.01) |
| *B60R 21/232* | (2011.01) |
| *B60R 21/235* | (2006.01) |
| *B60R 21/237* | (2006.01) |
| *B60R 21/213* | (2011.01) |

(52) U.S. Cl.
CPC .......... *B60R 21/235* (2013.01); *B60R 21/201* (2013.01); *B60R 21/213* (2013.01); *B60R 21/232* (2013.01); *B60R 21/237* (2013.01); *B60R 2021/23542* (2013.01); *B60R 2021/23547* (2013.01)

(58) Field of Classification Search
CPC ... B60R 21/201; B60R 21/232; B60R 21/235; B60R 21/237; B60R 21/213; B60R 2021/23542; B60R 2021/23547; B60R 2021/23509; D03D 1/02; D10B 2505/124
USPC ........................................... 280/730.2, 728.2
See application file for complete search history.

(56) References Cited

U.S. PATENT DOCUMENTS

| | | | |
|---|---|---|---|
| 2004/0200540 A1 | 10/2004 | Busskamp et al. | |
| 2011/0042923 A1* | 2/2011 | Hatfield | B60R 21/232 280/730.2 |
| 2014/0099016 A1* | 4/2014 | Adams | B60R 21/213 382/141 |
| 2014/0265265 A1* | 9/2014 | Kemp | B60R 21/235 280/728.2 |
| 2015/0210241 A1 | 7/2015 | Kashio et al. | |

FOREIGN PATENT DOCUMENTS

| | | |
|---|---|---|
| JP | 2006-117123 A | 5/2006 |
| JP | 2010-265574 A | 11/2010 |
| JP | 2011-073562 A | 4/2011 |
| JP | 2015-140086 A | 8/2015 |

* cited by examiner

*Primary Examiner* — Keith J Frisby
(74) *Attorney, Agent, or Firm* — Posz Law Group, PLC

(57) ABSTRACT

An airbag package includes a one-piece woven airbag in a folded shape, a plurality of markers that are formed on the airbag, and a plurality of tape members that are bound around the airbag at locations of the markers for keeping the folded shape of the airbag. Each of the markers is composed of a weave structure that is different from that of surroundings in the airbag.

2 Claims, 7 Drawing Sheets

Prior Art

AIRBAG PACKAGE

CROSS REFERENCE TO RELATED APPLICATIONS

The present application claims priority from Japanese Patent Application No. 2019-177700 of Kakimoto, filed on Sep. 27, 2019, the entire disclosure of which is incorporated herein by reference.

BACKGROUND

1. Technical Field

The present invention relates to an airbag package that an airbag formed by one-piece-woven (OPW) technology is folded up and tied by tapes for keeping the folded shape. More particularly, the invention relates to an airbag package of a curtain airbag, by way of example, folded and tied by shape-keeping tapes for easy mounting on a vehicle.

2. Description of Related Art

JP2015-140086 A discloses an OPW curtain airbag that is configured to be mounted on an upper periphery of side windows of a vehicle in the form of an airbag package, i.e. in a folded form. The airbag package is tied by shape-keeping tapes at a plurality of positions. This curtain airbag is provided with a plurality of mounting tabs which are configured to be secured to the vehicle. The mounting tabs are formed in an upper edge of the airbag as unfolded. The airbag package is formed by rolling the airbag as unfolded from the lower edge towards the upper edge so that the mounting tabs protrude therefrom, and tying the rolled airbag with the shape-keeping tapes at positions dislocated from the mounting tabs. The shape-keeping tape is made of such a sheet material (e.g. non-woven material) that would not scatter but break at airbag deployment and is coated with an adhesive. The above airbag includes, in the upper edge, a plurality of cut-out portions that serve as markers indicating the positions to tie by the tapes. The tapes are bound around the rolled airbag at the positions of the markers, i.e. the cut-out portions.

When an airbag is formed by OPW technology, multiple airbags are woven in a fabric at a time, then the airbags are cut out from the fabric in a predetermined shape by a laser cutter. The cut-out portions explained above, which serve as the markers to indicate the positions to tie, are also formed by the laser cutter in the cutting process.

Each airbag is designed to include more than one cut-out portion, and each of the cut-out portions is formed in a predetermined depth, in the upper edge of the airbag. That is, the forming of the cut-out portions causes an increase of production cost of the airbag.

Moreover, in the airbag which is tied by the shape-keeping tapes at positions of the cut-out portions, the tied portions sink due to a pressing force of the tapes in comparison with adjoining untied portions. The adjoining untied portions slightly bulge relative to the tied portions. Furthermore, since both edges of the cut-out portions are located adjacent the tied tapes, i.e. in the adjoining untied portions which bulge relative to the tied portions, the edges easily turn up. When the airbag package is mounted on the vehicle, a special attention must be paid so that the edges of the cut-out portions may not turn up and also so that the turned edges of the cut-out portions may not be brought into engagement with environmental members.

It would be desirable to provide an airbag package of an airbag that can be produced with less cost and has less difference in outer shape between the tied portion and adjoining untied portions.

SUMMARY

An airbag package of an exemplary embodiment includes a one-piece woven airbag in a folded shape, a plurality of markers that are formed on the airbag, each of the markers being composed of a weave structure that is different from that of surroundings in the airbag, and a plurality of tape members that are bound around the airbag at positions of the markers for keeping the folded shape of the airbag.

In the airbag package of the exemplary embodiment, it is desired that:
the airbag is configured as a curtain airbag that is adapted to be mounted on an upper periphery of at least one side window of the vehicle;
in a flatly developed state, the airbag includes an upper edge, a lower edge and a plurality of mounting tabs that protrude from the upper edge for mounting on the upper periphery of the side window of the vehicle;
the airbag includes a rolled portion that is rolled from the lower edge towards the upper edge; and
the markers are located on an outer surface of the airbag package and in a vicinity of the upper edge of the airbag.

In the airbag package of the exemplary embodiment, it is further desired that:
the airbag includes:
a bag portion that has two woven layers and is configured to receive an inflation gas between the two woven layers;
a closed portion that is located in a periphery of the bag portion and has a single woven layer; and
a terminal portion that is located in a circumference of the closed portion and towards an outer edge of the airbag, the terminal portion having two, a first and a second, woven layers,
the markers are located in the terminal portion of the airbag; and
each of the markers is composed of a weave structure that includes multiple interconnected portions in each of which either a warp or a weft of the first woven layer is connected with either a weft or a warp of the second woven layer.

DETAILED DESCRIPTION

Exemplary embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
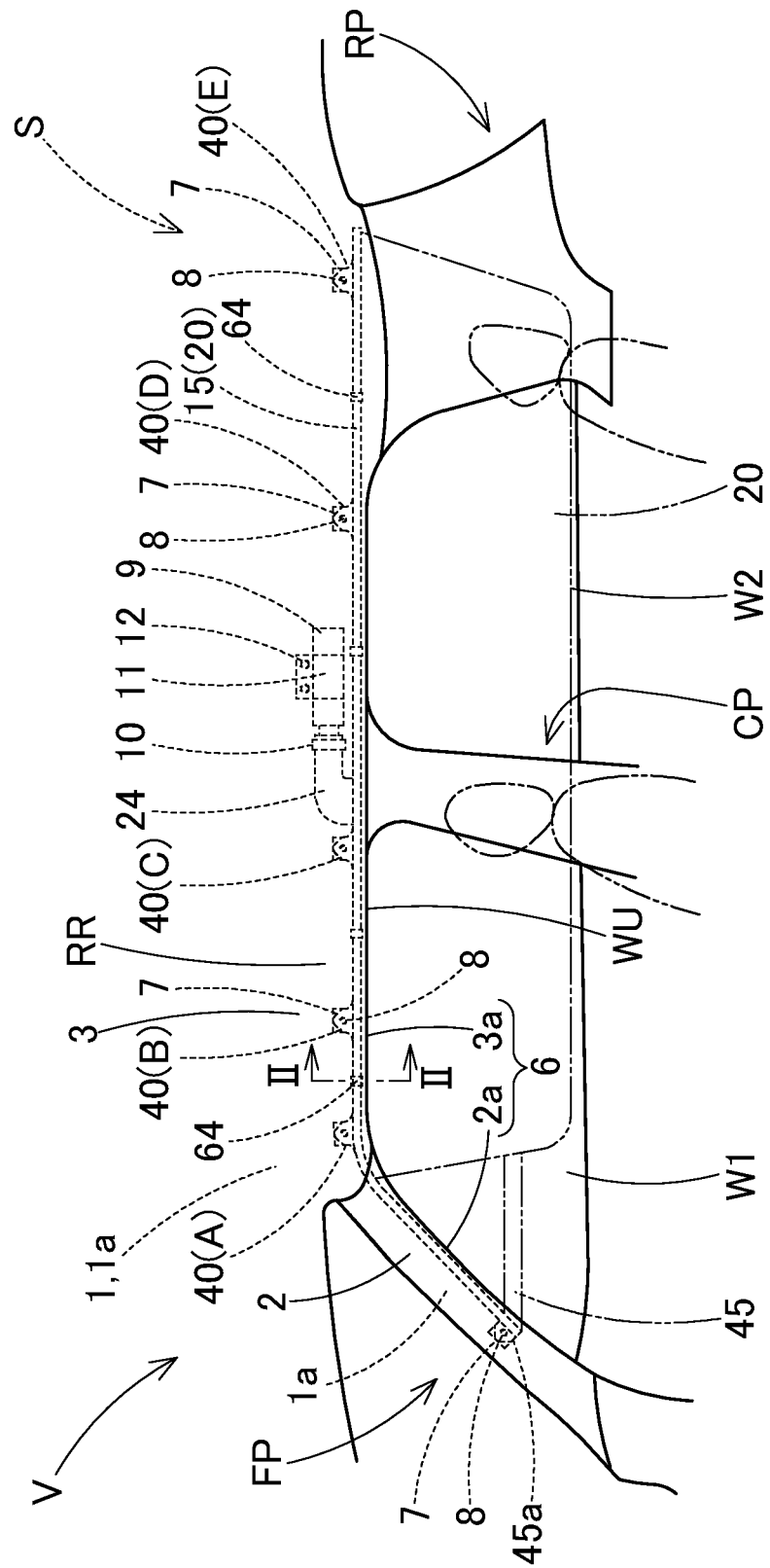
FIG. 1 is a schematic front view of a curtain airbag device which employs an airbag package in accordance with an exemplary embodiment, as mounted on a vehicle and viewed from an interior of a vehicle.
Figure 2:
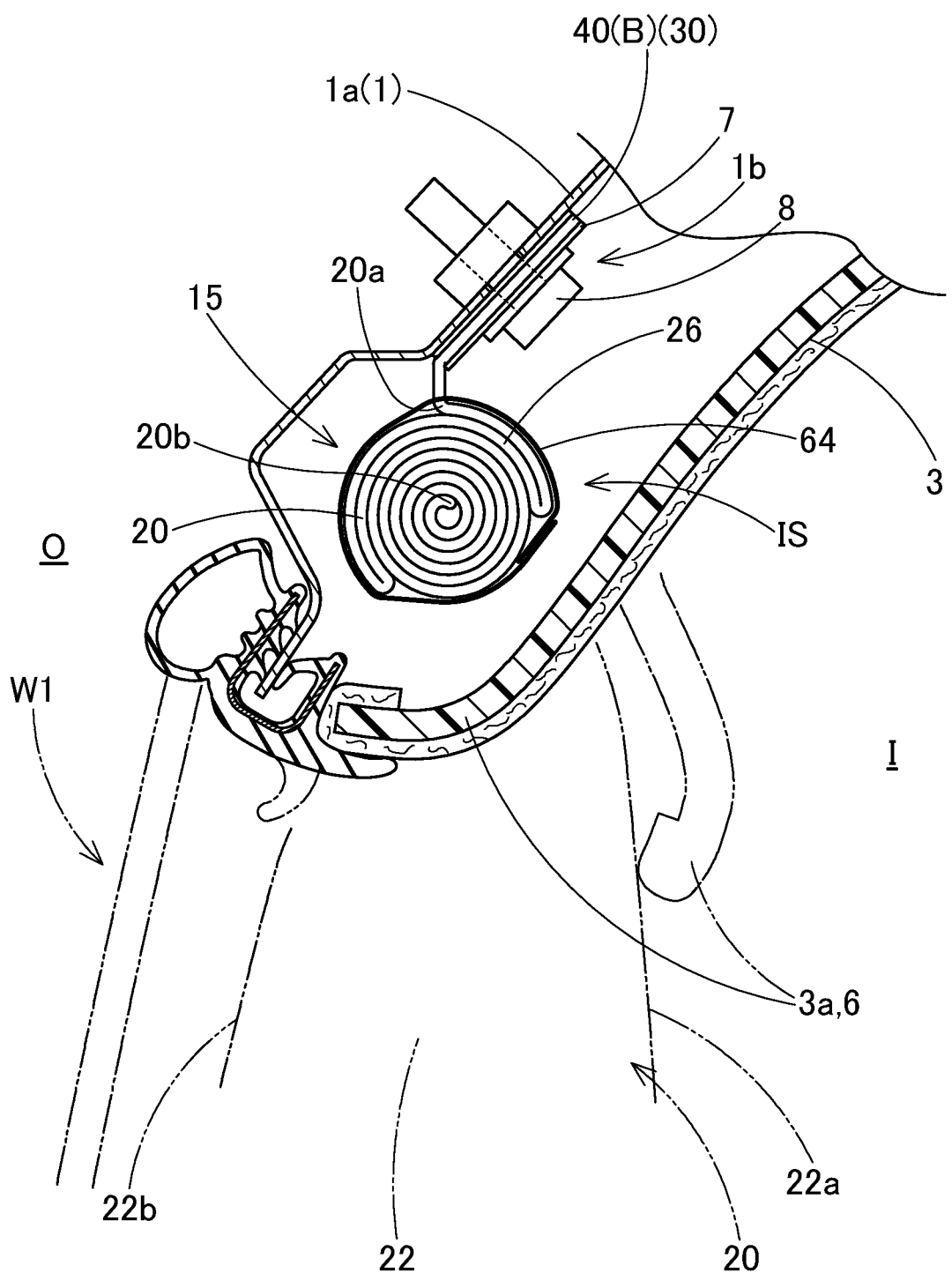
FIG. 2 is a schematic partial sectional view of the curtain airbag device of FIG. 1 as mounted on board, taken along line II-II of FIG. 1.

An airbag package 15 of a curtain airbag 20 in accordance with an exemplary embodiment is for use in a curtain airbag device S depicted in FIGS. 1 and 2. The airbag device S is mounted on a vehicle V with two rows of seats. The vehicle V has a front side window W1 and a rear side window W2. The airbag device S includes the airbag 20 which has been formed into the airbag package 15, an inflator 9, and an airbag cover 6. The airbag package 15 is stored in an area ranging from the lower rim of a front pillar FP through a region above a rear pillar RP, via a lower rim of a roof side rail RR, in the upper peripheries of the windows W1 and W2 inside the vehicle V.

The airbag cover 6 is composed of a lower rim 2a of a front pillar garnish 2 arranged on the front pillar FP and a lower rim 3a of a roof head liner 3 arranged on the roof side rail RR. The airbag cover 6 covers an inboard side of the airbag package 15, and is configured to open towards an interior I of the vehicle V for allowing the airbag 20 to be deployed downward and towards the interior I of the vehicle when pushed by the airbag 20 as actuated.

As shown in FIG. 1, the inflator 9 is configured to feed the airbag 20 with an inflation gas. The inflator 9 is substantially cylindrical in outer shape, and includes not-shown gas discharge ports at the leading end region. The leading end region of the inflator 9 provided with the gas discharge ports is inserted into a later-described connection port section 24 of the airbag 20, and a clamp 10 is used to fasten the connection port section 24 and inflator 9, thus the inflator 9 is coupled with the airbag 20. A mounting bracket 11 holds the inflator 9. The inflator 9 is secured to an inner panel 1a, a body structure 1 of the vehicle V, at a position above the rear side window W2 by the mounting bracket 11. The inflator 9 is electrically connected to a not-shown control device of the vehicle V by a not-shown lead wire, and is designed to be actuated by an actuating signal fed from the control device as has detected a side impact, an oblique collision or a rollover of the vehicle V.

Figure 3:
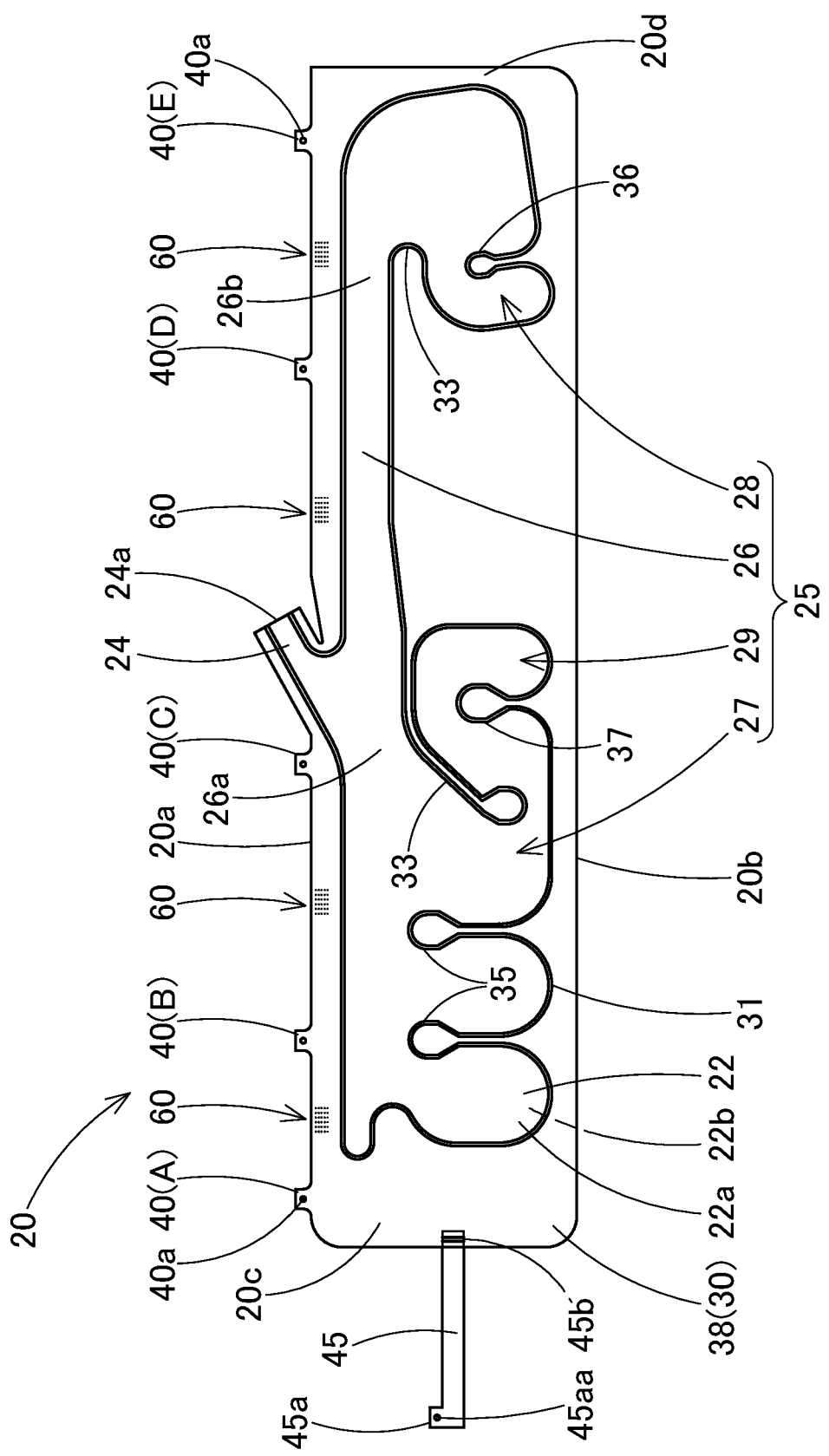
FIG. 3 is a front view of the curtain airbag of the exemplary embodiment as unfolded.

Referring to FIGS. 2 and 3, the airbag 20 is formed by one-piece-woven technology using yarns of polyamide, polyester or the like. The airbag 20 includes a gas receivable region 22 which is inflatable with an inflation gas by separating an inboard side wall 22a and an outboard side wall 22b, and a non-receptive region 30 which receives no inflation gas.

The gas receivable region 22 is composed of a bag portion 51 which has two woven layers 51a formed of warps VS and wefts HS (FIG. 5) by one-piece-woven technology. As can be seen in FIGS. 1 to 3, the gas receivable region 22 includes a deployable region 25 which is designed to unfold from the folded state and cover the inboard side of the side windows W1, W2, and the connection port section 24 which protrudes upwardly from a vicinity of the center in a front and rear direction of an upper edge 20a of the airbag 20 for connection with the inflator 9. The deployable region 25 includes a gas feed path 26 which is arranged along the upper edge 20a of the airbag 20 for feeding the inflation gas as let in from the connection port section 24 towards the front and rear, a front inflatable region 27 for covering the inboard side of the front side window W1, a rear inflatable region 28 for covering the inboard sides of the rear side window W2 and the rear pillar RP, and a middle inflatable region 29 for covering the inboard sides of a middle pillar CP and a front portion of the rear side window W2.

Referring to FIG. 3, the non-receptive region 30 includes a border portion 31 which defines a border of the gas receivable region 22, a plurality of partitioning portions 33 which extend from the border portion 31, go into the gas receivable region 22 and partition the gas feed path 26, the front inflatable region 27, rear inflatable region 28 and middle inflatable region 29, and a plurality of thickness-regulating portions 35, 36, 37 which are disposed within the gas receivable region 22. The border portion 31, partitioning portions 33 and thickness regulating portions 35, 36, 37 are each composed of a later-described closed portion 54 which is so woven as to have a single woven layer of the warps VS and wefts HS (FIG. 5) of one-piece-woven fabric.

Figure 5:
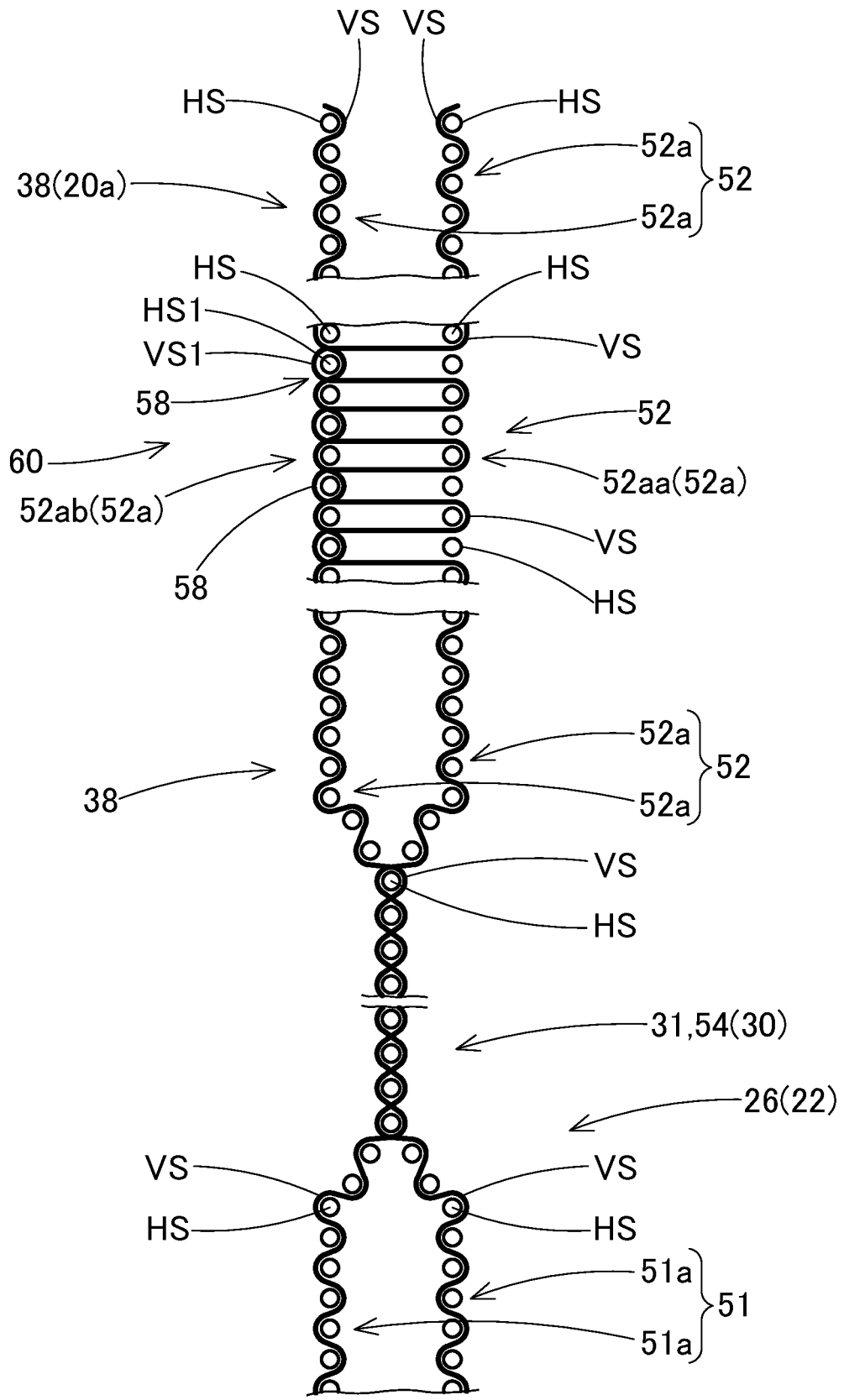
FIG. 5 is an enlarged schematic sectional view taken along line V-V of FIG. 4.

The non-receptive region 30 further includes a peripheral portion 38 which extends outwardly from the border portion 31 which defines the border of the gas receivable region 22. The peripheral portion 38 is disposed in the upper edge 20a, lower edge 20b, front edge 20c and rear edge 20d of the airbag 20, and forms the edges 20a, 20b, 20c and 20d. The peripheral portion 38 is composed of a terminal portion 52 which is so woven as to have two woven layers 52a of the warps VS and wefts HS, as can be seen in FIG. 5.

In the airbag 20 of the exemplary embodiment, polyamide yarns of 350 dtex fineness are used as raw yarns of the warps VS and wefts HS. An EPI (ends per inch) is 135 yarns/inch and a PPI (picks per inch) is 121 yarns/inch. The closed portion 54 is woven in a plain weave of 1×1 weave structure or the like, and the woven layers 51a, 52a in the bag portion 51 and closed portion 54 are woven in a twill weave of 1×2 weave structure.

As can be seen in FIG. 3, a plurality of mounting tabs 40 (A to E) protrude from the peripheral portion 38 in the upper edge 20a of the airbag 20. Each of the mounting tabs 40 is provided with a mounting hole 40a for receiving such a mounting member 8 as a mounting bolt which mounts the airbag package 15 on the upper periphery WU of the side windows W1, W2. A reinforcing plate 7 of sheet metal or the like is applied to each of the mounting tabs 40. Each of the mounting tabs 40 is secured to the inner panel 1a together with the reinforcing plate 7 by the mounting member 8 in the upper periphery WU of the side windows W1, W2.

A mounting belt 45 composed of a cloth member of polyamide or the like is sewn to the front edge 20c of the airbag 20 by the root portion 45b. The mounting belt 45 is provided with a mounting hole 45aa in the leading end 45a. A reinforcing plate 7 is also applied to the leading end 45a of the mounting belt 45, and the mounting belt 45 is secured to the inner panel 1a together with the reinforcing plate 7 by the mounting member 8 in the front pillar FP.

Figure 4:
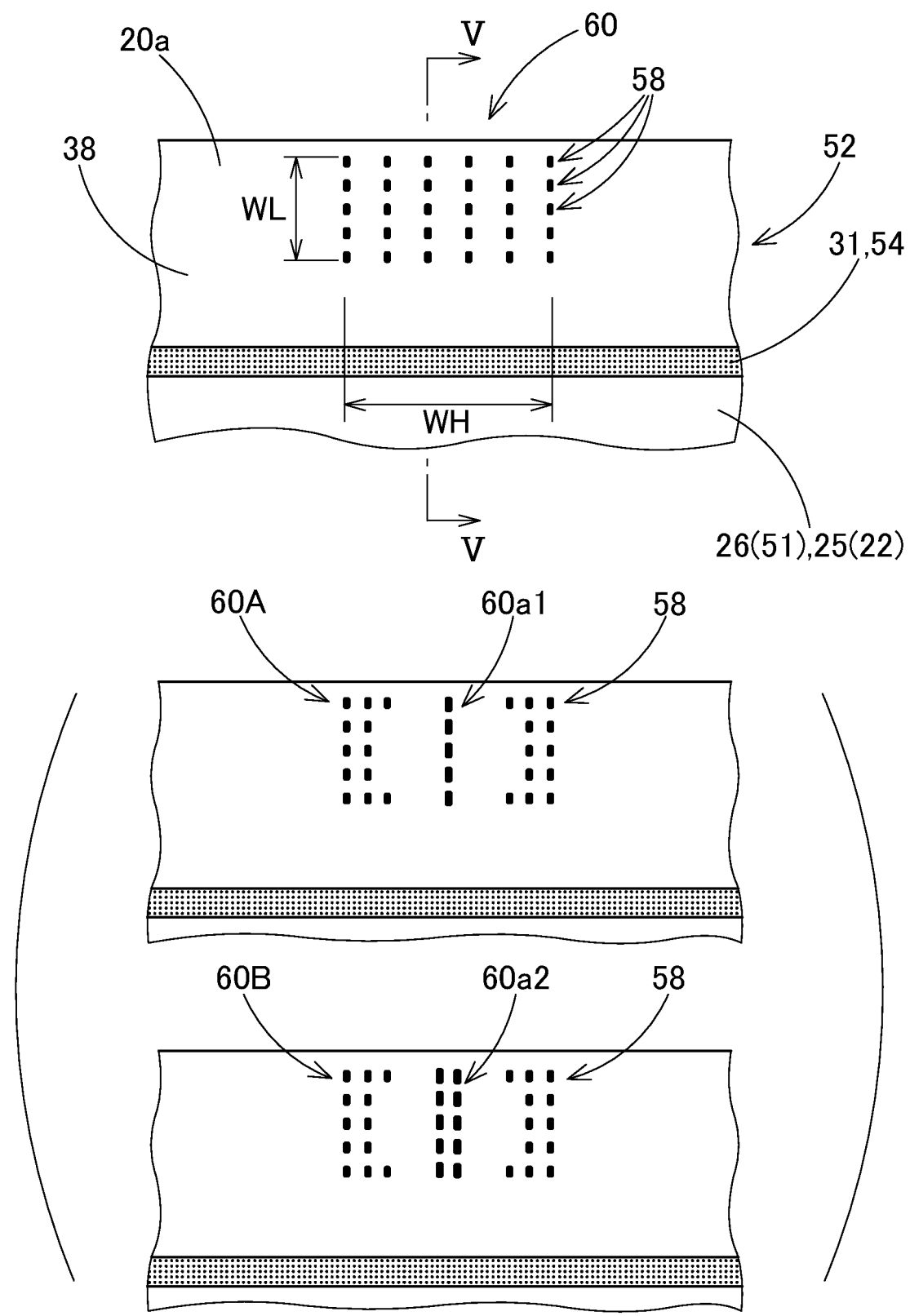
FIG. 4 is an enlarged front view depicting a marker formed in the curtain airbag of the exemplary embodiment.

Referring to FIGS. 3 and 4, the airbag 20 further includes, in the upper edge 20a where the mounting tabs 40 are disposed, a plurality of markers 60 that indicate the positions to tie the airbag 20 with tape members 64. That is, the markers 60 are located in the peripheral portion 38 (i.e. the terminal portion 52) of the airbag 20. When formed into the airbag package 15, the airbag 20 as flatly developed is rolled from the lower edge 20b towards the upper edge 20a so that the mounting tabs 40 protrude upward in the folded state.

Figure 6:
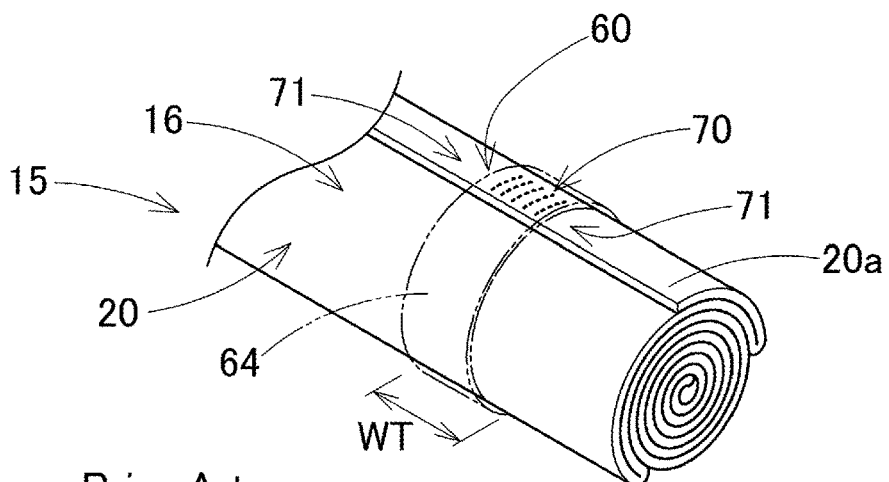
FIG. 6 depicts the way the airbag package of the curtain airbag of the exemplary embodiment is tied by a tape member.
Figure 6:
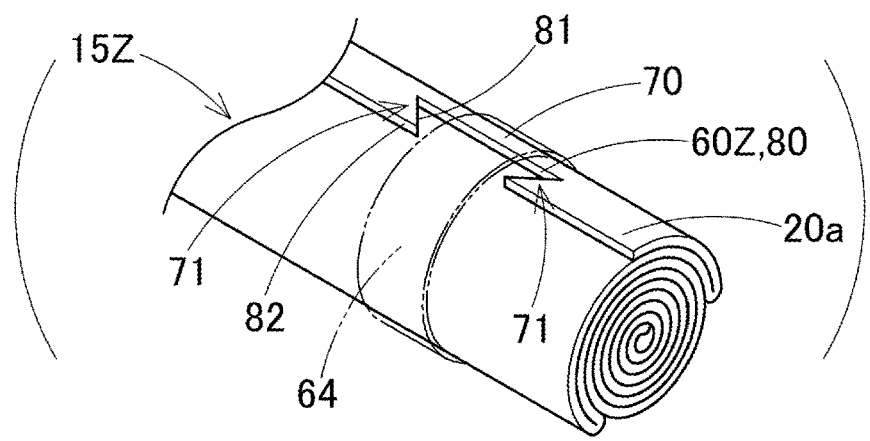
Figure 7:
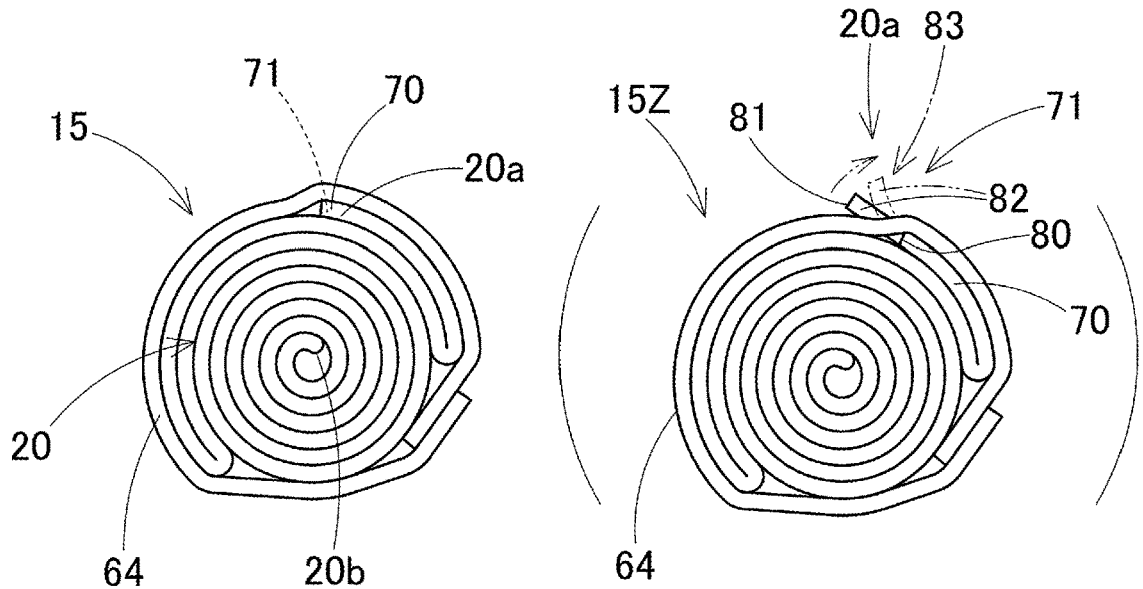
FIG. 7 is a cross sectional view of the airbag package as tied by the tape member.

Thus, the upper edge 20a where the markers 60 are formed is located on an outer surface 16 of the package 15, as can be seen in FIGS. 6 and 7.

Each of the markers 60 is composed of a weave structure that is different from that in the surroundings. More particularly, referring to FIG. 5, the weave structure forming each of the markers 60 includes numerous interconnected portions 58 in each of which a constituent yarn VS1, which is either a warp VS or a weft HS, of a first woven layer 52aa out of the two woven layers 52a in the peripheral portion 38, i.e. terminal portion 52, of the airbag 20, is connected or bound with a constituent yarn HS1, which is either a weft HS or a warp VS, of a second woven layer 52ab. In this specific embodiment, the numerous interconnected portions 58 are arranged with a predetermined space between one another, thus forming each of the markers 60.

In this specific embodiment, four markers 60 are formed at positions dislocated from the mounting tabs 40. As can be seen in FIGS. 4 and 6, each of the markers 60 is formed generally into a rectangle the width WH of which is generally equal to the width WT of the tape member 64. Each of the tape members 64 is made of non-woven material coated with adhesive.

The airbag package 15 is formed by providing the airbag 20 as equipped with the mounting belt 45 at the front edge 20c, and rolling the airbag 20 from the lower edge 20b towards the upper edge 20a on the outboard side wall 22b. The upper edge 20a region of the airbag 20 where the gas feed path 26 is located is folded in concertina fashion so that an inflation gas as has flown from the connection port section 24 easily flows towards the front inflatable region 27 and rear inflatable region 28.

Figure 8:
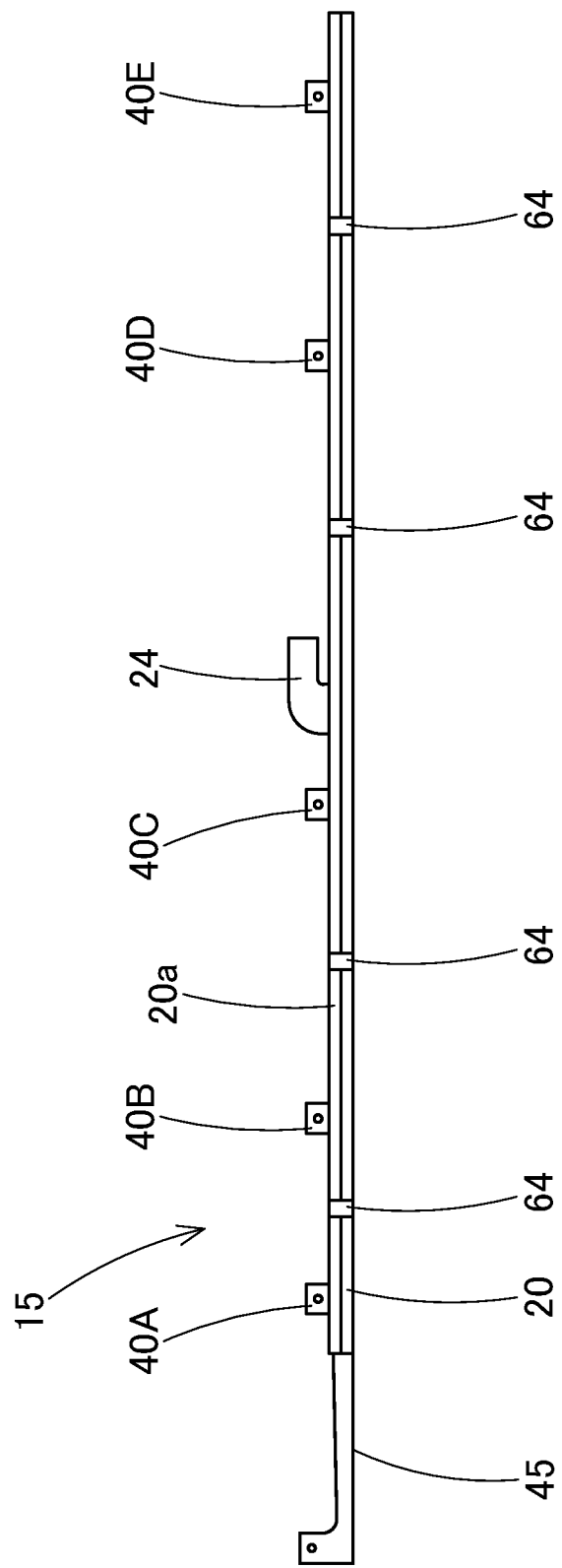
FIG. 8 is a front elevation of the airbag package of the exemplary embodiment.

If the airbag as folded by rolling and concertina folding is tied by the tape members 64 at locations of the four markers 60, the airbag package 15 is completed as can be seen in FIG. 8.

Mounting of the airbag package 15 on the vehicle V is now described. The reinforcing plates 7 are attached to the mounting tabs 40 and leading end 45a of the mounting belt 45, and the inflator 9 as coupled with the mounting bracket 11 is connected with the connection port section 24 of the airbag package 15, thereby forming an airbag module. Then the mounting tabs 40 and mounting belt 45 including the reinforcing plates 7 are secured to the inner panel 1a with the mounting members 8, and the mounting bracket 11 is bolt 12 fixed to the inner panel 1a. If then a lead wire extending from the not shown control device for feeding an actuating signal is connected with the inflator 9, the airbag module, i.e. airbag device S, is mounted on the vehicle V, as shown in FIG. 1.

When the curtain airbag device S as mounted on board is actuated in response to an actuating signal fed from the control device in the event of a side impact crash, an oblique collision or a rollover of the vehicle V, the inflator 9 feeds an inflation gas to the airbag 20. The gas flows from the connection port section 24 to the gas feed path 26, then flows from the gas feed path 26 to the inflatable regions 27, 28, 29, so that the airbag 20 unfolds and is inflated, breaks the tape members 64, pushes and opens the airbag cover 6 composed of the lower rims 2a and 3a of the pillar garnish 2 and roof head liner 3, and is deployed over the side windows W1, W2, middle pillar CP, and rear pillar RP on the inboard side I of the vehicle V, as indicated with dashed-and-double-dotted lines in FIG. 1.

In the airbag package 15 in accordance with the exemplary embodiment, each of the markers 60 that indicate the positions to tie the folded airbag 20 by the tape members 64 is composed of the weave structure that can be formed in the one-piece-woven process of the airbag 20. The weave structure of the marker 60 can be formed merely by forming multiple interconnected portions 58 such that the weave structure looks different from that of the surroundings, and requires no additional production process. This saves the production cost. The marker 60 composed of the weave structure different from that of the surroundings provides no shape difference between the portion with the marker and the portion with no marker, unlike the marker composed of a cut-out portion. Further, as can be seen in FIGS. 6 and 7, it does not form a big shape difference between the tied portions 70 and adjacent untied portions 71. Yet additionally, with the markers 60 composed of the weave structure different from that of the surroundings, there is no fear of turn-up of the edge 20a of the airbag 20 in vicinities of the tied portions 70. Therefore, the airbag package 15 can be smoothly mounted on the vehicle with no turn-up in the vicinities of the tied portions.

Parentheses in FIGS. 6 and 7 show an instance where a marker 60Z is composed of a cut-out portion 80, and a tape member 64 is wound around the marker 60Z. In this case, untied portions 71 on both sides of the tied portion 70, i.e. corners 82 of edges 81 of the cut-out portion 80 in the upper edge 20a of the airbag 20, turn up easily. If a turn-up 83 of the corner 82 is great, it may be engaged with a member in the environment when the airbag package 15Z is mounted on the vehicle V.

Therefore, the airbag package 15 in accordance with the exemplary embodiment may be produced with less cost and has less difference in outer shape between the tied portion 70 by the tape member 64 and adjoining untied portions 71.

The airbag 20 in accordance with the exemplary embodiment is configured as a curtain airbag that is adapted to be mounted on the upper periphery WU of the side window W1, W2 of the vehicle V in the form of the airbag package 15. The airbag 20 includes a plurality of mounting tabs 40 that protrude from the upper edge 20a of the airbag 20 as flatly developed and are configured to be mounted on the vehicle V. The airbag 20 is rolled from the lower edge 20b towards the upper edge 20a such that the mounting tabs 40 protrude from the airbag package 15. The markers 60 are located on the outer surface 16 of the airbag package 15 and in a vicinity of the upper edge 20a of the airbag 20.

The airbag package 15 thus configured is prevented from warping and upturning in the upper edge 20a of the airbag 20 in the vicinities of the tied portions 70 by the tape members 64, and is easily mounted on the vehicle by securing the mounting tabs 40 to predetermined mounting positions 1b on the inner panel 1a even in an instance where the vehicle has a limited space IS in vicinities of the mounting positions 1b in an inner side of the inner panel 1a.

In the exemplary embodiment, the airbag 20 includes the bag portion 51 that has two woven layers 51a woven with warps VS and wefts HS and is configured to admit an inflation gas between the woven layers 51a, the closed portion 54 that is located in the periphery of the bag portion 51 and has a single woven layer woven with warps VS and wefts HS, and the terminal portion 52 that is located in a circumference of the closed portion 54 and towards the outer edge (upper edge 20a, lower edge 20b, front edge 20c and rear edge 20d) of the airbag 20 and has two woven layers 52a woven with warps VS and wefts HS, i.e. the first layer 52aa and second layer 52ab. The markers 60 are located in the terminal portion 52. Each of the markers 60 is composed of the weave structure that includes multiple interconnected portions 58 in each of which a constituent yarn VS1, which is either a warp VS or a weft HS, of the first woven layer 52*aa* is connected or bound with a constituent yarn HS1, which is either a weft HS or a warp VS, of the second woven layer 52*ab*.

This configuration provides the markers 60 easily merely by forming, in the terminal portion 52, the multiple interconnected portions 58 of the constituent yarn VS1 of the first woven layer 52*aa* and the constituent yarn HS1 of the second woven layer 52*ab*.

If each of the markers 60 is composed of the weave structure that includes multiple interconnected portions 58 of a constituent yarn VS1 of the first woven layer 52*aa* and a constituent yarn HS1 of the second woven layer 52*ab*, the shape and/or size of the marker 60 may be easily arranged by varying the arrangement and/or number of the interconnected portions 58. That way the marker 60 may serve a function of indicating not only the position of tying but also the order of tying, as can be seen in a parenthesis of FIG. 4, by way of example. The marker 60A in the parenthesis in FIG. 4 includes a mark 60*a*1 approximating the sign "I", as an indication of the position to tie first by the tape member 64. The marker 60B includes a mark 60*a*2 approximating the sign "II", as an indication of the position to tie secondly by the tape member 64.

That is, one airbag 20 may have more than one differently designed markers by varying the arrangement and/or number of the interconnected portions 58.

When the peripheral portion of a one-piece woven airbag includes the terminal portion which has two woven layers of warps and wefts, the interconnected portions are also sometimes formed spottedly so as to prevent fluttering between the two woven layers. In order for the marker for indicating the tying position by the tape member to be distinguished at a glance from such interconnected portions for preventing fluttering, it is desirable, when forming the marker 60, 60A, 60B, to gather the interconnected portions 58 within the width WH which generally coincides with the width WT of the tape member 64. The width of a tape member used to tie the airbag is usually 10 to 20 mm. The width WT of the tape member 64 of this specific embodiment is approximately 15 mm. The length WL of the marker 60 is desirably an approximately half of the width WT of the tape member 64 or longer, and so short as not to reach the closed portion 54 which has a different weave structure from the terminal portion. This configuration makes the marker 60, 60A, 60B easily visible.

The marker formed in the terminal portion has only to have a different weave structure from that of the surroundings. Other than forming multiple interconnected portions, the marker may be composed of the closed portion 54, which has only one woven layer of warps and wefts, formed in a predetermined shape such as a generally rectangle having the same width as the width WT of the tape member 64. Further, the shape of the marker should not be limited to a rectangle like the markers 60, 60A, 60B shown in the drawings. The marker may be formed into various shapes such as triangle.

In the foregoing embodiment, the airbag 20 formed into the airbag package 15 is a curtain airbag. However, the airbag should not be limited thereto as long as the airbag package is composed of an airbag folded up and tied by tape member.

In the foregoing embodiments, the airbag 20 has the mounting tabs 40 (A to E) integrally. However, in a similar fashion to the mounting belt 45, the mounting tabs 40 may be provided separately and sewn to the upper edge 20*a* of the one-piece-woven airbag 20.

What is claimed is:

1. An airbag package adapted to be mounted on a vehicle, the airbag package comprising:
   a one-piece woven airbag in a folded shape;
   a plurality of markers that are formed on the airbag, each of the markers being composed of a weave structure that is different from that of surroundings in the airbag; and
   a plurality of tape members that are bound around the airbag at positions of the markers for keeping the folded shape of the airbag,
   wherein the airbag includes:
   a bag portion that has two woven layers and is configured to receive an inflation gas between the two woven layers;
   a closed portion that is located in a periphery of the bag portion and has a single woven layer; and
   a terminal portion that is located in a circumference of the closed portion and towards an outer edge of the airbag, the terminal portion having two, a first and a second, woven layers,
   wherein the markers are located in the terminal portion of the airbag; and
   wherein each of the markers is composed of a weave structure that includes multiple interconnected portions in each of which either a warp or a weft of the first woven layer is connected with either a weft or a warp of the second woven layer.

2. An airbag package adapted to be mounted on a vehicle, the airbag package comprising:
   a one-piece woven airbag in a folded shape;
   a plurality of markers that are formed on the airbag, each of the markers being composed of a weave structure that is different from that of surroundings in the airbag; and
   a plurality of tape members that are bound around the airbag at positions of the markers for keeping the folded shape of the airbag, wherein
   the airbag is configured as a curtain airbag that is adapted to be mounted on an upper periphery of at least one side window of the vehicle;
   in a flatly developed state, the airbag includes an upper edge, a lower edge and a plurality of mounting tabs that protrude from the upper edge for mounting on the upper periphery of the side window of the vehicle;
   the airbag includes a rolled portion that is rolled from the lower edge towards the upper edge; and
   the markers are located on an outer surface of the airbag package and in a vicinity of the upper edge of the airbag;
   wherein the airbag includes:
   a bag portion that has two woven layers and is configured to receive an inflation gas between the two woven layers;
   a closed portion that is located in a periphery of the bag portion and has a single woven layer; and
   a terminal portion that is located in a circumference of the closed portion and towards an outer edge of the airbag, the terminal portion having two, a first and a second, woven layers,
   wherein the markers are located in the terminal portion of the airbag; and
   wherein each of the markers is composed of a weave structure that includes multiple interconnected portions in each of which either a warp or a weft of the first woven layer is connected with either a weft or a warp of the second woven layer.

* * * * *